United States Patent [19]

Strauss

[11] Patent Number: 4,553,142
[45] Date of Patent: Nov. 12, 1985

[54] APPARATUS FOR MOUNTING A TOUCH CONTROL PANEL ASSEMBLY TO A CRT

[75] Inventor: Paul Strauss, Chicago, Ill.

[73] Assignee: Zenith Electronics Corporation, Glenview, Ill.

[21] Appl. No.: 420,147

[22] Filed: Sep. 20, 1982

[51] Int. Cl.[4] .............................................. G09G 1/00
[52] U.S. Cl. ..................................... 340/712; 358/246; 340/365 P; 200/159 B; 411/537
[58] Field of Search ................ 200/5 A, 159 B; 340/712, 700, 365 UL, 365 A, 365 P; 358/246; 411/345, 371, 531, 532, 537, 538, 368

[56] References Cited

U.S. PATENT DOCUMENTS

| | | | |
|---|---|---|---|
| 2,770,161 | 11/1956 | Schutte | 411/537 |
| 3,039,645 | 6/1962 | Castiglia | 411/537 |
| 3,271,516 | 9/1966 | Damm | 358/246 |
| 3,422,721 | 1/1969 | Yonkers | 411/538 |
| 4,004,092 | 1/1977 | Rogers | 358/246 |
| 4,031,553 | 6/1977 | Sumiyoshi et al. | 358/246 |
| 4,066,855 | 1/1978 | Zenk | 200/5 A |
| 4,427,861 | 1/1984 | Stillie | 340/365 UL |

OTHER PUBLICATIONS

*One-Point Touch Input of Vector Information for Computer Displays;* Herot et al.; Computer Graphics, vol. 12, #3; Aug. 1978.

*Primary Examiner*—Marshall M. Curtis

[57] ABSTRACT

A touch panel assembly support system for a CRT includes a lightweight rigid frame surrounding the tube for supporting the touch panel elements in predetermined alignment. The frame is mounted to cut-away portions of the CRT mounting ears to preclude inducing stress in the frame during mounting to the ears and to isolate it from any stress created during mounting of the CRT to a support.

10 Claims, 7 Drawing Figures

APPARATUS FOR MOUNTING A TOUCH CONTROL PANEL ASSEMBLY TO A CRT

BACKGROUND OF THE INVENTION

This invention is directed generally to a touch panel assembly used with an interactive cathode ray tube (CRT) display system for changing the graphics in response to a user touching one or more selected areas of the CRT faceplate and particularly to means for supporting a touch panel assembly in fixed relationship to a CRT.

Conventional graphics display apparatus include a CRT and a plurality of light or other energy sources and receptors generating a network or grid of crossing energy paths closely adjacent to the front of the CRT faceplate. Interruption of an energy path, for example by a user touching the faceplate, results in a signal to the CRT graphics controller for changing the graphics displayed in accordance with the area touched and the system computer program. The touch panel, as used herein includes the structure supporting the energy sources and receptors.

There are many touch panel arrangements extant. A particularly useful one is disclosed in copending application Ser. No. 408,096 filed Aug. 13, 1982 in the names of Rowe and Fitzgibbon, which application has been abandoned in favor of continuation application Ser. No. 619,098, filed June 11, 1984, assigned to the present assignee, in which a plurality of light sources is positioned along each axis with a single light collection device or plate, constructed of light transmissive material such as plastic disposed along the respective opposite axis. The two plates are arranged with their forward ends disposed to the sides of the CRT faceplate to enable collection of light from the opposite arrays of light sources and for direction of that light rearwardly to a light collection area. Thus, rather than having individual light pipes or receptors, a single horizontal and a single vertical light collector plate is used.

The light sources are conveniently arranged on a printed circuit board and supported adjacent to the CRT faceplate opposite the light collecting plates or receptors. The collection plates are fairly massive and must be rigidly supported with respect to their respective sources. Depending upon the wavelengths of the energy sources used, the permissible misalignment between the sources and the receptors may be extremely small. Consequently, the touch panel assembly should maintain the sources and receptors in alignment with each other and should preferably hold them in fixed relationship to the CRT faceplate.

OBJECTS OF THE INVENTION

A principal object of the invention is to provide a novel touch panel system for a CRT.

A further object of the invention is to provide a touch panel system for a CRT for supporting the energy sources and receptors in fixed alignment with each other and which doesn't require critical tolerances.

A still further object of the invention is to provide a touch panel assembly for a CRT which is simple and non-critical in installation.

A feature of the invention resides in the provision of a lightweight rigid frame for supporting the touch panel components directly on the CRT.

A further feature of the invention resides in the provision of positioning means which substantially isolate the rigid frame supporting the touch panel components from the means for mounting the CRT to a support.

A still further feature of the invention resides in the provision of positioning means for mounting the rigid frame supporting the touch panel components to the CRT without stress.

SUMMARY OF THE INVENTION

In accordance with one aspect of the invention a support system for a CRT touch panel assembly having accurately aligned energy sources and receptors producing a grid of crossing energy paths adjacent to the CRT faceplate includes a lightweight rigid frame for holding the source and receptors in proper alignment and positioning means for mounting the rigid frame to the CRT in fixed position while inducing substantially zero stress in the rigid frame.

In accordance with another aspect of the invention, a support system for a CRT touch panel assembly having accurately aligned energy sources and receptors producing a grid of crossing energy paths adjacent to the CRT faceplate includes mounting means for mounting the CRT to a support, a lightweight rigid frame for holding the sources and receptors in proper alignment and positioning means for mounting the rigid frame to the CRT in fixed position and for isolating the rigid frame from stresses created by the mounting means.

In accordance with yet another aspect of the invention, a support system as defined above includes positioning means for isolating the frame from stresses created by the mounting means and for mounting the frame to the CRT with substantially zero stress.

BRIEF DESCRIPTION OF THE DRAWINGS

Further objects, features and advantages of the invention will become apparent upon reading the following description of the preferred embodiment thereof in conjunction with the drawings in which like references in the various figures refer to like elements and in which.

DESCRIPTION OF THE PREFERRED EMBODIMENT

Figure 1:
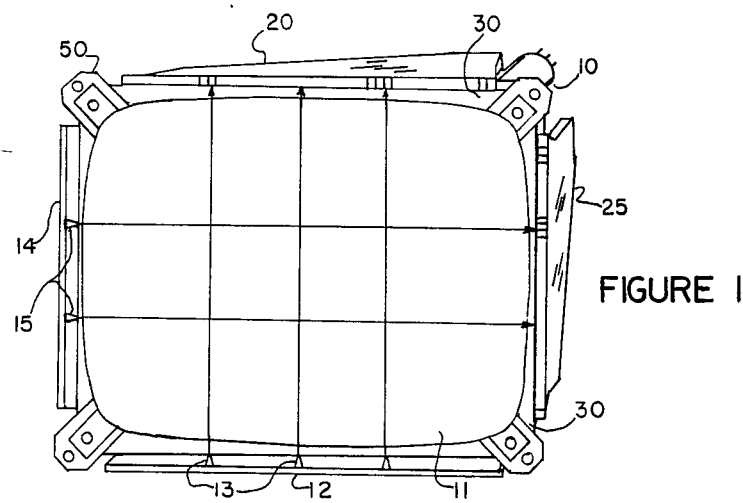
FIG. 1 represents a CRT and touch panel system constructed in accordance with the invention.

Referring to FIG. 1, a CRT 10 is shown having a faceplate 11 and mounting ears 50. At the bottom of the CRT faceplate is a printed circuit board 12 supporting a plurality of spaced light sources 13. At the left side of the faceplate is a printed circuit board 14 supporting a plurality of spaced light sources 15. At the top of the faceplate is a horizontal light collector plate or receptor 20 for collecting light from light sources 13 and directing it toward the back of the CRT. On the right side of the faceplate is a vertical light collector plate or receptor 25 for similarly collecting light emitted from oppositely disposed light sources 15 on printed circuit board 14 and directing the light toward the rear of the CRT. A frame 30 supports light collector plates 20 and 25 and printed circuit boards 12 and 14 in proper relationship to the CRT faceplate and to each other. The intersecting lines drawn across the faceplate indicate light paths traversing the faceplate and producing a grid of crossing light paths which may be interrupted by a user touching the faceplate with a finger, pencil or other suitable device. It will be appreciated by those skilled in the art that the number of light sources shown is merely illustrative and that a much larger number of the sources may be used. For example, with a conventional CRT of 12" diagonal measurement, the panel would preferably have 19 light sources along the vertical axis of the faceplate and 25 light sources along the horizontal axis. Also the light sources indicated are LED's (light emitting diodes) which are conveniently mounted on the circuit boards. However other type energy sources may be readily used. The arrangement for switching of the light sources is not shown since that is not part of the invention and many such arrangements are well known in the art. The receptors 20 and 25 are preferably made of a dimensionally stable plastic material such as acrylic and the energy detectors, located at the rear of the receptors, are omitted for clarity.

Figure 2:
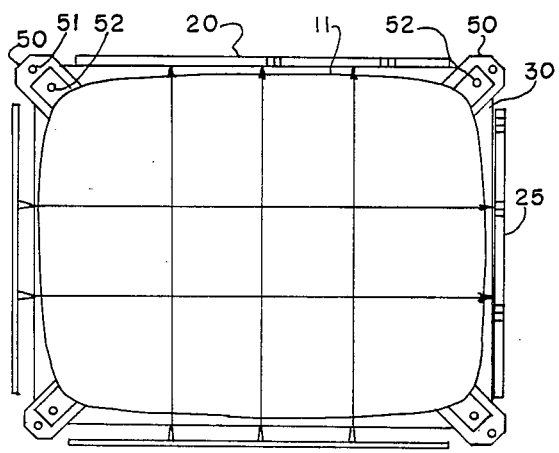
FIG. 2 is a frontal view of the system of FIG. 1.

FIG. 2 is a front view of the CRT and system of FIG. 1 and illustrates the compactness of the touch panel assembly which is substantially completely within the boundary of the CRT. Very little additional space is required. Indeed, the back of the rigid lightweight frame may conveniently be used to mount the CRT drive and deflection components to form an extremely compact subassembly. As will be seen, the mounting studs supporting the frame may be extended outwardly to support a bezel or escutcheon adjacent the tube base to seal out foreign objects and present a decorative appearance.

Figure 3:
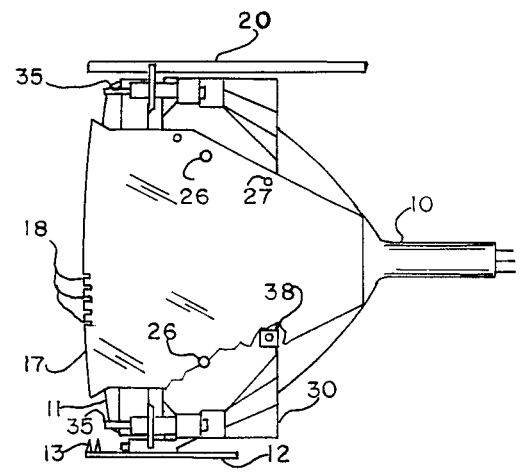
FIG. 3 is a side view of the system of FIG. 2.

In FIG. 3 a side view of the structure of FIG. 2 is shown to further indicate the shape of the vertical collector plate 25 and its mounting to frame 30. Also shown in this Figure are the positioning means 35 for supporting frame 30 to mounting ears 50 on the CRT. A pair of locating holes 26 are provided in the vertical collector plate, which is firmly attached to the side of frame 30 by a pair of screws 27 (only one of which is shown) which cooperate with fastener means 38 in the side of the frame. It will be noted that the forward end of the light collector plate is curved as indicated by reference 17. The curvature matches the CRT faceplate curvature, which, for conventional CRTs is circular since the faceplate is spherical. Similarly the circular curvature of the horizontal receptor or light collector plate 20 matches the curvature of the faceplate. Further, the light sources are similarly arranged on the circuit boards to be in alignment with the forward edges of the corresponding light collector plates. The plates may be serrated as indicated at 18 and angled with mirrored surfaces (not shown) for better isolation of light received from the light sources. Serration and mirroring substantially enhances the noise immunity of the touch panel system by improving the ability of the collector plates to collate and direct light from the separate sources without interference from other sources. The serrations impose another degree of alignment precision on the system as would using energy of shorter wavelengths and using separate receptors.

Figure 4:
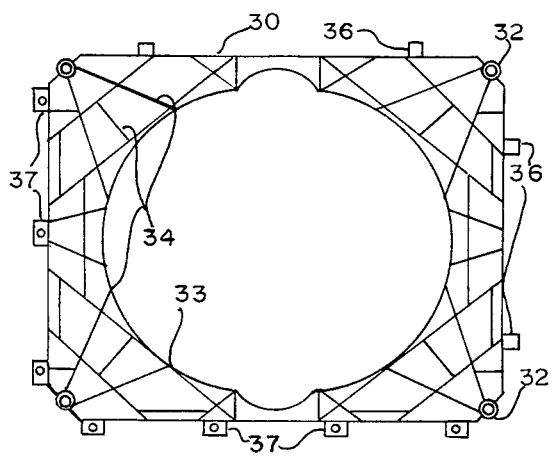
FIG. 4 is a front view of the rigid frame for supporting the touch panel components.

In FIG. 4 a front view of rigid frame 30 is shown. It is generally rectangular in configuration and includes four precisely located cylindrical mounts 32, one at each corner. The mounts are precisely located since they are defined in the process of molding the frame and are therefore capable of being consistently replicated. The frame generally defines an elongated circular opening 33 for enabling it to be positioned over the body of a CRT. It is preferably injection-molded from a lightweight plastic material. A plurality of ribs 34 are included for strengthening purposes, the objective being to produce a very lightweight, rigid structure. Along the top and right hand surfaces of the frame is a plurality of locating bosses 36 which cooperate with apertures in the light collecting plates for alignment and mounting. Located along the adjacent sides of the frame is a plurality of mounting bosses 37 for supporting the printed circuit boards in proper position.

Figure 5:
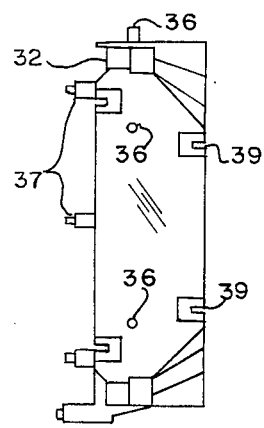
FIG. 5 is a side view of the rigid frame of FIG. 4.

Reference to FIG. 5 will more clearly indicate the configuration of frame 30. The cylindrical mounts are recessed with respect to the back of the frame and, as will be seen, are part of the positioning means for mounting the frame to the CRT mounting ears. The rear of the frame includes a pair of slots 39 in each side for reception of spring clip type threadless fasteners to enable screws 38 to be received therein. Consequently, the combination of locating bosses 36 fitting in locating holes 26 and screws 27 affixed to fasteners 38 in slots 39, enables the light collector plates to be firmly and accurately attached to frame 30.

The specific configuration of the frame and the means for mounting the collector plates should be understood to be representative and other mounting means may readily be employed. Similarly the printed circuit boards may be mounted to the frame in a variety of ways.

It should be apparent that a degree of care is required in fabricating the rigid frame to assure that the proper geometrical relationship exists between the light sources and the collector plates. Well known manufacturing techniques may be used to attain the required accuracy, bearing in mind the size of the CRT, the type of beam energy and the degree of inherent noise immunity in the touch panel system used. Experience indicates that the need for separate fixtures or jigs for alignment purposes is eliminated with the system of the invention. Alignment tolerances are readily maintained with the rigid frame, and its precision located cylindrical mounts, and the collector plates with their "keyed" locating means. As will be seen, the positioning means assure that alignment is maintained during installation of the frame to the CRT and during installation of the CRT to its support.

The rigid frame enables accurate alignment of the sources and receptors on a mass production basis. To assure maintenance of this alignment positioning means are provided for enabling the frame to be mounted on the CRT in a manner which precludes stressing of the frame, which stress could lead to cold flow of the material and consequent misalignment of the touch panel components. Further, once the touch panel is assembled to the CRT, the CRT must also be mounted to its support in a cabinet or the like. As will be seen, the mounting means for the CRT are arranged such that stresses created during mounting of the CRT are substantially isolated from the frame. Since the entire panel structure is supported on the very rigid CRT, the invention enables a CRT, complete with touch panel assembled, to be mass produced and sold without the need for alignment after installation. Also, since the entire touch panel assembly (and indeed the operating circuitry for the CRT) is within the confines of the outline of the CRT, it will be readily recognized that the invention yields a convenient touch panel CRT assembly that is a direct replacement or "retrofit" for existing CRTs, which feature materially enhances its saleability.

A further feature of the positioning means is that it enables additional attachments to be made to the precisely located points defined by the cylindrical mounts on the frame without upsetting alignment or inducing stress in the frame. For example, a functional as well as decorative bezel or escutcheon may be desired and positioned without disturbing the alignment of the touch panel assembly.

Figure 6:
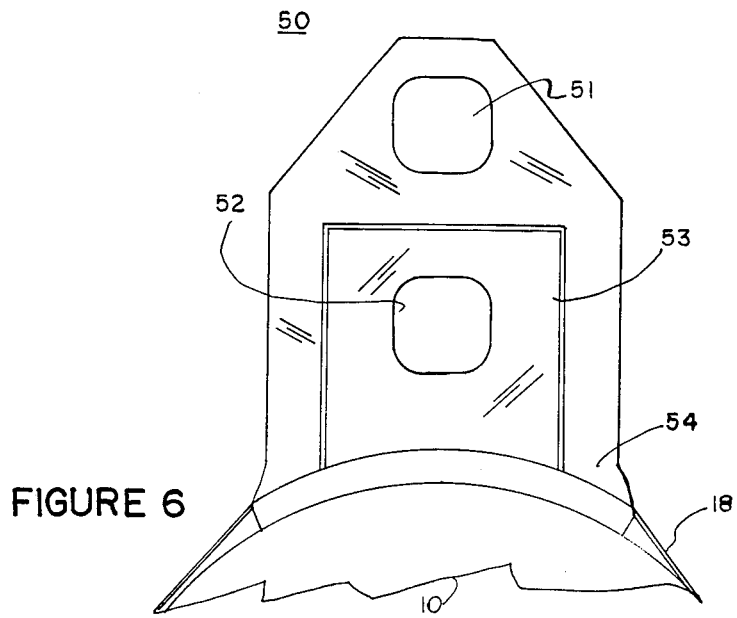
FIG. 6 is an enlarged partial view of a mounting ear for the CRT.

FIG. 6 is a partial view of an enlarged portion of a corner of the CRT showing a mounting ear 50. The mounting ear depicted is substantially the same as the mounting ears of prior art CRTs having integral implosion protection. For many years CRTs have not needed a separate safety glass in addition to the tube faceplate because of "rim bonding" and "shell bonding" techniques which apply compression forces to the faceplate. Tests have shown that properly "loaded" faceplates preclude violent implosions of the CRT. In the shell bond configuration a metal shell slightly larger than the faceplate surrounds its periphery and the gap is filled with an expanding epoxy which provides the pressure on the faceplate. The mounting ears are formed in the shell. The more conventional rim bond tube has four individual mounting ears held by a highly tensioned metal band which provides the required pressure on the faceplate for implosion protection. With this type construction especially, the precision with which the mounting ears are positioned is quite variable and it is not unusual to find ears that are offset with respect to the CRT corners or ears that are not coplanar. Consequently a touch panel assembly mounted to the ears may be subjected to numerous stresses and distortions during mounting of the CRT to a support. Further, if a rigid frame is used, mounting it to the ears will create stresses should there be variations or substantial deviations in alignment of the mounting ears. Obviously, the same difficulty is encountered if other attachments using the frame mounting points, are attempted.

The first problem is solved in accordance with one aspect of the invention by essentially isolating the mounting means for the CRT from the structure to which the frame is mounted. The mounting ear in FIG. 6 includes a CRT mounting aperture 51 and a frame mounting aperture 52. A portion 53 of the frame mounting aperture is cut away from the body of the mounting ear which produces a cantilever type construction. The base 54 of the mounting ear substantially conforms to the curvature of the corner of the CRT and a tensioned strap 18 supports the mounting ear to the CRT. This strap also provides the necessary compression of the faceplate for implosion protection.

Figure 7:
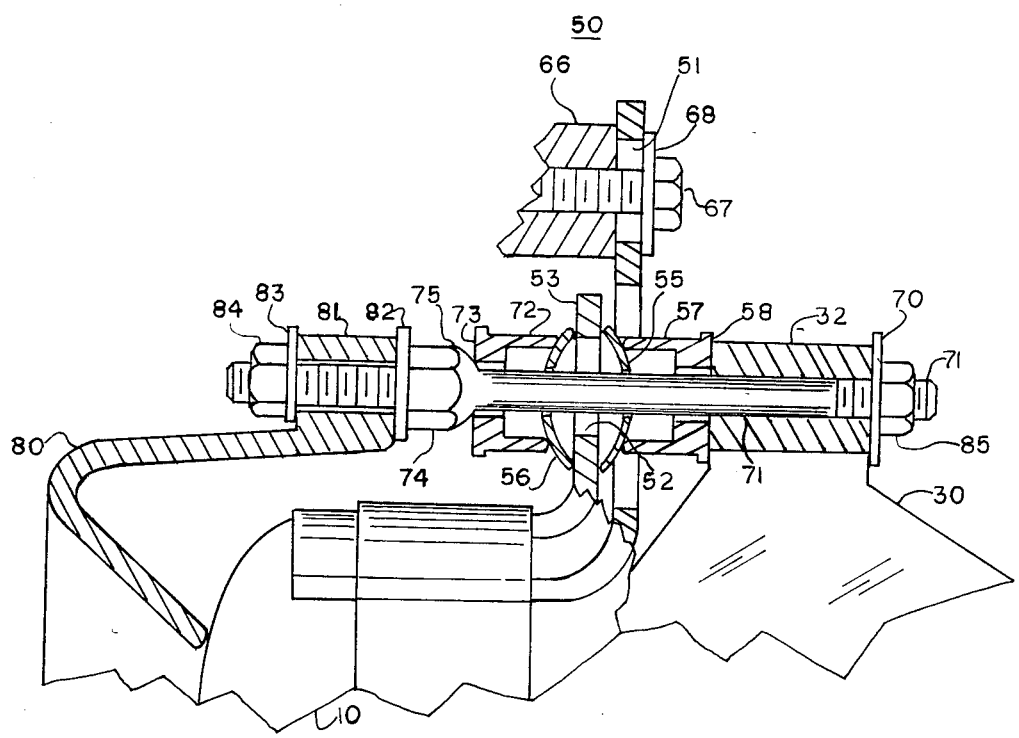
FIG. 7 is a sectional view taken along the line 7—7 of the mounting ear of FIG. 6 with mounting elements comprising the positioning means of the invention added and also showing how a bezel or escutcheon may be attached.

In FIG. 7 a sectional view of the mounting ear of FIG. 6 taken along line 7—7 is shown with additional elements of the positioning means for mounting the frame to the mounting ears illustrated, as well as a portion of a decorative bezel.

Cantilevered portion 53 is seen to be displaced from the plane of the body of mounting ear 50. Both CRT mounting aperture 51 and frame mounting aperture 52 are enlarged to accommodate slightly displaced mounting ears. Thus the alignment requirement between a support stud 66 on a support cabinet or the like and CRT mounting aperture 51 is relaxed. A washer 68 or a screw 67 further assists in compensating for misalignment between the mounting ear and support stud 66.

The positioning means comprise a series of parts for fastening frame 30, via cylindrical mounts 32 to the cantilevered portions 53 of the mounting ears. A pair of domed washers 55 and 56 are shown interposed on either side of cantilevered portion 53. A conventional washer 70 is interposed between a nut 72 on mounting bolt 71, and cylindrical mount 32. A cylindrical member 57 with a large washer-like surface 58 is incorporated on the opposite side of cylindrical mount 32. An identical cylindrical member 72 with an enlarged washer-like surface 73 is positioned on the other side of cantilevered portion 32. The open ends of cylindrical members 57 and 72 contact domed washer 55 and 56, as shown. A nut-like portion 74 having a cylindrical surface 75 is affixed to bolt 71 and completes the positioning means for mounting the frame to the mounting ears.

As shown, the bolt 71 is extended for supporting a bezel or escutcheon 80 in position closely adjacent the faceplate of picture tube 10. The bezel will have a section transparent to the energy emitted from the LED's (or other energy sources) and serves as decorative protection for the energy sources and receptors (not shown for clarity). It will be appreciated that in certain instances it is desirable to precisely locate the bezel and the present arrangement enables this because bolts 71 are precisely located by the cylindrical mounts 32 in rigid frame 30. Bezel 80 includes mounts 81 which are sandwiched between conventional washers 82 and 83 and held to bolt 71 by means of a nut 84. It will be obvious that the illustration of a bolt is not to be considered limiting, since machine parts may be readily employed.

It will be appreciated that the arrangement shown will enable rigid frame 30 to be attached to cantilevered portions 53, without creating stress in the frame, over a wide range of alignment deviation between the mounting apertures 52 in cantilevered portions 53 and precisely located cylindrical mounts 32 in the frame. Consequently the precision location of the mounting bolts may be retained without stressing the frame during attachment to the mounting ears. Nut-like portion 74 has flat sides to enable convenient holding of bolt 71 during tightening of nuts 84 and 85.

Thus the touch panel assembly may be mounted to the CRT mounting ears without fear of any substantial strain in the frame. To assure this condition, namely a strain free mounting, only three of the four mounts need be used. It will also be appreciated that cutting away the frame mounting aperture 52 from mounting ear 50 substantially isolates the frame from stresses created by mounting the CRT to a support. Consequently a very stable low cost system for a touch panel installation for a CRT results.

What has been described is a novel touch panel support system for a CRT which is simple, economical, maintains accurate alignment and is rugged in use. It is recognized that numerous changes may be made in the embodiment described without departing from the true scope and spirit of the invention and that the invention is to be limited only as defined in the following claims.

What is claimed is:

1. A support system for a CRT touch panel assembly having accurately aligned energy sources and receptors producing a grid of crossing energy paths adjacent to the faceplate of a CRT that includes mounting elements permanently affixed thereto, said mounting elements being subject to variations in location and including surfaces that are not coplanar comprising:

a lightweight rigid frame for holding said sources and said receptors in proper alignment; and positioning means for mounting said rigid frame to said mounting elements of said CRT in fixed position, said positioning means including means for compensating for said variations in location of said mounting elements and means for compensating for said surfaces not being coplanar and thereby effectively eliminating stress in said rigid frame when said rigid frame is mounted to said CRT.

2. The support system of claim 1 wherein said mounting elements are part of the CRT implosion protection system.

3. The support system of claim 2 wherein said mounting elements each comprises a mounting ear defining a mounting aperture, and wherein said rigid frame includes precisely located cylindrical mounts; and wherein said positioning means include enlarged apertures in said mounting elements, bolt means passing through said enlarged apertures and arcuate bearing surface means to compensate for misalignment between said mounting ears and said cylindrical mounts caused by said slight variations in location of said mounting elements and to compensate for said mounting element surfaces being non-coplanar.

4. The support system of claim 3 wherein said arcuate bearing surface means include washers defining first spherical surfaces and first cup-shaped cylindrical members; said first cup-shaped cylindrical members being oppositely positioned against said spherical surfaces; and wherein said bolt means include elongate rigid fasteners attaching said frame to said ears through said cylindrical mounts, said first cup-shaped cylindrical members and said first spherical surfaces.

5. The support system of claim 4 further including a bezel for said CRT; said fasteners having extensions for locating said bezel in a predetermined position relative to said frame.

6. The support system of claim 3 wherein each of said mounting ears has a portion defining a CRT mounting aperture for mounting said CRT to a support and a second portion defining said enlarged aperture for mounting said rigid frame to said CRT, said second portion being partially cut away from said ear.

7. The support system of claim 4 wherein said positioning means further include washers defining second spherical surfaces adjacent to said frame mounting apertures and second cup-shaped cylindrical members in contact therewith and in alignment with said cylindrical mounts in said rigid frame.

8. The support system of claim 7 further including a protective bezel for said CRT and wherein said rigid fasteners have extended ends defining circular bearing surfaces engaging the closed ends of said second cylindrical members for location of said bezel in precise relationship to said frame.

9. A support system for a CRT touch panel assembly having accurately aligned energy sources and receptors producing a grid of crossing energy paths adjacent to the faceplate of a CRT that includes mounting ears as part of the CRT implosion system and permanently affixed thereto, said mounting ears being subject to variations in location and including surfaces that are not coplanar comprising:

a lightweight rigid frame including precisely located cylindrical mounts for holding said sources and said receptors in proper alignment; and positioning means for mounting said rigid frame to said mounting ears in fixed position, said positioning means including means for compensating for said variations in location of said mounting ears and means for compensating for said surfaces not being coplanar to thereby effectively eliminate stress in said rigid frame when said rigid frame is mounted to said CRT, said mounting ears each defining an enlarged mounting aperture and said positioning means further including elongate rigid connectors passing through said enlarged apertures, washers defining first spherical surfaces, and first cup-shaped cylindrical members, said first cup-shaped cylindrical members being oppositely positioned against said spherical surfaces.

10. The support system of claim 9 wherein each of said mounting ears has a portion defining a CRT mounting aperture for mounting said CRT to a support and a portion defining said enlarged aperture for mounting said rigid frame to said CRT, said last-mentioned portion being partially cut away from said ear.

* * * * *